United States Patent
Chang

(10) Patent No.: US 6,843,582 B2
(45) Date of Patent: Jan. 18, 2005

(54) BACK LIGHT MODULE

(75) Inventor: Yi-Hui Chang, Hsinchu (TW)

(73) Assignee: Toppoly Optoelectronics Corp. (TW)

( * ) Notice: Subject to any disclaimer, the term of this patent is extended or adjusted under 35 U.S.C. 154(b) by 0 days.

(21) Appl. No.: 10/422,725

(22) Filed: Apr. 25, 2003

(65) Prior Publication Data
US 2004/0213000 A1 Oct. 28, 2004

(51) Int. Cl.$^7$ ................................................ F21V 5/00
(52) U.S. Cl. .................... 362/240; 362/244; 362/245; 362/329
(58) Field of Search ...................... 362/29, 31, 328, 362/329, 330, 339, 332, 331, 235, 237, 240, 244, 245, 225, 336

(56) References Cited

U.S. PATENT DOCUMENTS 5,128,783 A * 7/1992 Abileah et al. ............. 349/162
5,384,658 A * 1/1995 Ohtake et al. .............. 359/707
6,578,990 B2 * 6/2003 Hildenbrand et al. ....... 362/341
6,666,569 B2 * 12/2003 Obata ......................... 362/339

* cited by examiner

Primary Examiner—Thomas M. Sember
(74) Attorney, Agent, or Firm—Lowe Hauptman Gilman & Berner, LLP

(57) ABSTRACT

An improved back light module that the special design of light guide plate can prevent from the non-uniform of illumination. The module includes a light source; a reflector below the light source to reflect back the downward light rays for increasing the illumination of the back light module; and a light guide plate above said light source that a first portion of the bottom surface of said light guide plate, which is over said light source, is a plane and a second portion of the bottom/top surface of said light guide plate, which is not over said light source, has a plurality of regular bumps/recesses for focusing the light rays to increase the illumination, wherein said first portion and said second portion are arranged alternately in order.

28 Claims, 4 Drawing Sheets

BACK LIGHT MODULE

BACKGROUND OF THE INVENTION

1. Field of the Invention

The invention relates to a back light module, more particularly to a back light module for large LCD device.

2. Description of the Prior Art

Among all kinds of flat display devices, a liquid crystal display (LCD) device with low electrical power consumption, low voltage operation, thin thickness and light weight, is widely used in nowadays. But an additional light module is needed for LCD device to show figures or pictures on the screen under the dark circumstance because liquid crystal does not have the character of light-emitting itself. Because most of the power (about 70%) is consumed by the light module for notebook, it is very important how to increase the illumination of light module or get the same illumination by using the lower power light source for upgrading the efficiency of light module and decreasing the consumed power.

Please refer to FIG. 1, a cross-sectional view of conventional structure of back light module 110 for large LCD device is shown. It comprises a light source 112; a light guide plate (LGP) 114; a reflector 116; a diffusor sheet 118; and a diffusor sheet 120. The light source 112 can be constituted by a row of cold cathode fluorescent lamp (CCFL) or an array of light emitting diode (LED). The material of light guide plate 114 is usually PMMA or plastic division with $TiO_2$ diffusion grains whose total volume is between about 50%~80% of light guide plate. The light rays are well distributed when they are collided with the $TiO_2$ diffusion grains. The reflector 116 is placed below the light guide plate 114 to reflect the downward light rays back into the light guide plate 114 for increasing the illumination of back light module 110. Besides, there are sequentially diffusor sheets 118 and prism sheets 120 on the light guide plate 114 for the light rays emitted from the light-emitting surface of light guide plate 114 can be further well distributed into the panel of liquid crystal device (not shown). The numbers of diffusor sheets and prism sheets are decided on the design of back light module 110.

The wave nature of light is well known now, so the obvious "interference" phenomenon is observed in the bottom surface of light guide plate 114 for the light rays emitted from the light source 112, as shown in FIG. 2. Sometimes the light rays meet in step (or in phase; constructive interference), sometimes they meet out of step (or out of phase; destructive interference), and sometimes they meet partially in step. When the light rays meet in step, they add together due to constructive interference and a bright fringe is displayed on the screen. In areas where the light rays meet totally out of step, they will subtract from each other due to destructive interference and a dark fringe will appear in the bottom surface of light guide plate 114. FIG. 3 is the enlarged view of the section A in FIG. 2. Similarly, the obvious "interference" phenomenon is still observed when the light source is constituted by an array of light emitting diode (LED).

Besides, a cold cathode fluorescent lamp (CCFL) is a line light source and a light emitting diode (LED) is point light source, so the illumination of light rays emitted from the above light source decreases when they travel longer distances. The maximum illumination on the section of light guide plate above the light source is got because the distance between the above both is shortest and the illumination on other section of light guide plate is smaller because the distance between the above both is longer. Therefore, a problem that the illumination on the bottom surface of light guide plate not well distributed is produced.

SUMMARY OF THE INVENTION

In the light of the state of the art described above, it is an object of the present invention to provide an improved back light module for large LCD device which is immune to the problems of the conventional back light module for large LCD device described above.

It is another object of this invention to provide an improved back light module for large LCD device that the special design of the top or bottom surface of the light guide plate can make the light rays emitted from the light source well distributed.

In view of the above and other objects which will become apparent as the description proceeds, there is provided according to a general aspect of the present invention an improved back light module which comprises a light source; a reflector below said light source to reflect back the downward light rays for increasing the illumination of said back light module; a light guide plate above said light source that a first portion of the bottom surface of said light guide plate, which is over said light source, is a plane and a second portion of the bottom surface of said light guide plate, which is not over said light source, has a plurality of regular bumps for focusing the light rays to increase the illumination, wherein said first portion and said second portion are arranged alternately in order.

Based on the idea described above, wherein said light source includes CCFL (Cold Cathode Fluorescent Lamp).

Based on the aforementioned idea, wherein said light source includes LED (light emitting diode).

Based on the idea described above, wherein the material of said light guide plate is PMMA.

Based on the aforementioned idea, wherein the material of said light guide plate is plastic division.

Based on the idea described above, wherein said light guide plate has a plurality of $TiO_2$ diffusion grains whose total volume is between about 50%~80% of said light guide plate.

Based on the idea described above, the improved back light module further comprises a diffusor sheet on said light guide plate.

Based on the aforementioned idea, the improved back light module further comprises a prism sheet on said light guide plate.

Based on the idea described above, wherein said first portion further comprises a matted surface thereon.

Based on the aforementioned idea, wherein said first portion further comprises a shined surface thereon.

Based on the idea described above, wherein said shined surface is a metal formed in sputtering way.

Based on the aforementioned idea, wherein said metal is selected from the group consisting of silver and aluminium.

Based on the idea described above, wherein said shined surface is a metal formed in vapor deposition way, Based on the aforementioned idea, wherein said metal is selected from the group consisting of silver and aluminium.

In view of the above and other objects which will become apparent as the description proceeds, there is provided according to a general aspect of the present invention an improved back light module which comprises a light source;

a reflector below said light source to reflect back the downward light rays for increasing the illumination of said back light module; a light guide plate above said light source that a first portion of the top surface of said light guide plate, which is over said light source, is a plane and a second portion of the top surface of said light guide plate, which is not over said light source, has a plurality of regular recesses for focusing the light rays to increase the illumination, wherein said first portion and said second portion are arranged alternately in order.

Based on the idea described above, wherein said light source includes CCFL (Cold Cathode Fluorescent Lamp).

Based on the aforementioned idea, wherein said light source includes LED (light emitting diode).

Based on the idea described above, wherein the material of said light guide plate is PMMA.

Based on the aforementioned idea, wherein the material of said light guide plate is plastic division.

Based on the idea described above, wherein said light guide plate has a plurality of $TiO_2$ diffusion grains whose total volume is between about 50%~80% of said light guide plate.

Based on the idea described above, the improved back light module further comprises a diffuser sheet on said light guide plate.

Based on the aforementioned idea, he improved back light module further comprises a prism sheet on said light guide plate.

Based on the idea described above, wherein said said first portion further comprises a matted surface thereon.

Based on the aforementioned idea, wherein said first portion further comprises a shined surface thereon.

Based on the idea described above, wherein said shined surface is a metal formed in sputtering way.

Based on the aforementioned idea, wherein said metal is selected from the group consisting of silver and aluminum.

Based on thee idea described above, wherein said shined surface is a metal formed in vapor deposition way.

Based on the aforementioned idea, wherein said metal is selected from the group consisting of silver and aluminum.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
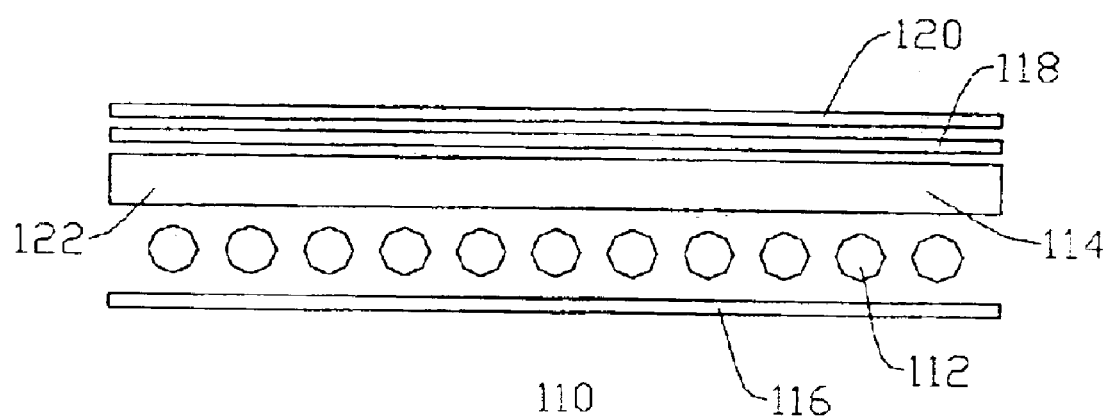
FIG. 1 illustrates a cross-sectional view of conventional structure of back light module for large LCD device.
Figure 2:
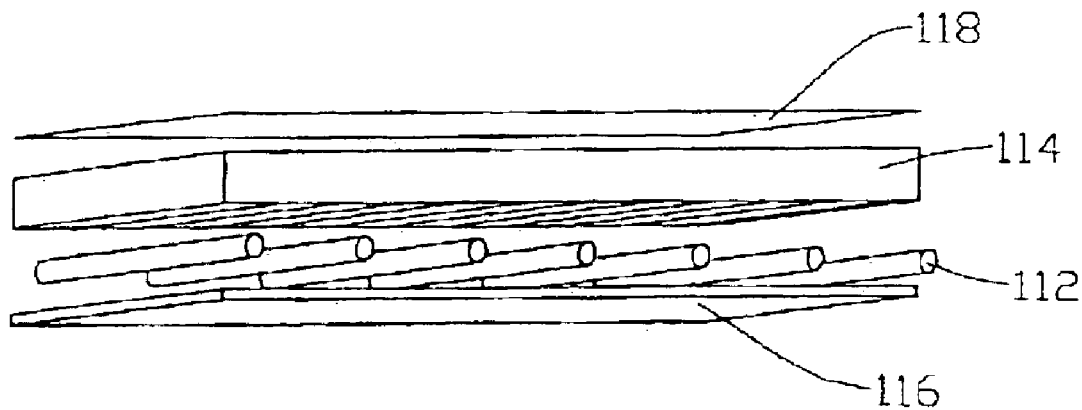
FIG. 2 illustrates a perspective view of conventional structure of back light module for large LCD device.
Figure 3:
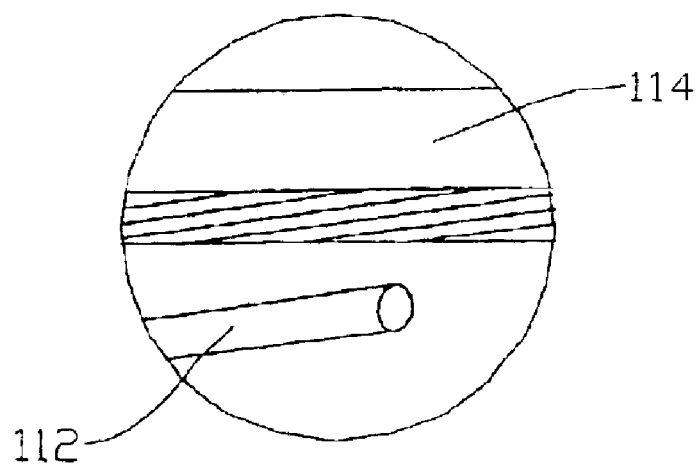
FIG. 3 illustrates an enlarged view of the section A in FIG. 2.
Figure 4:
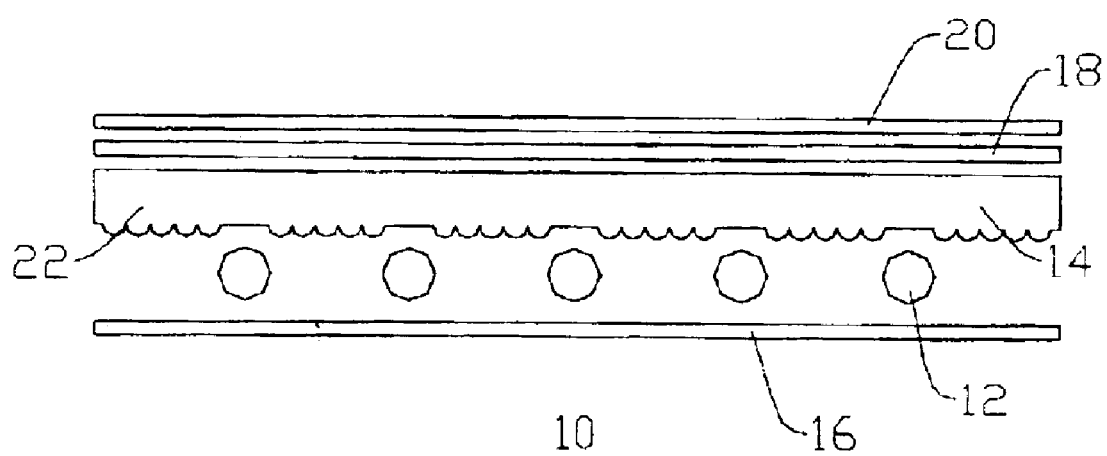
FIG. 4 illustrates a cross-sectional view of back light module for large LCD device according to the first embodiment of the present invention.
Figure 5:
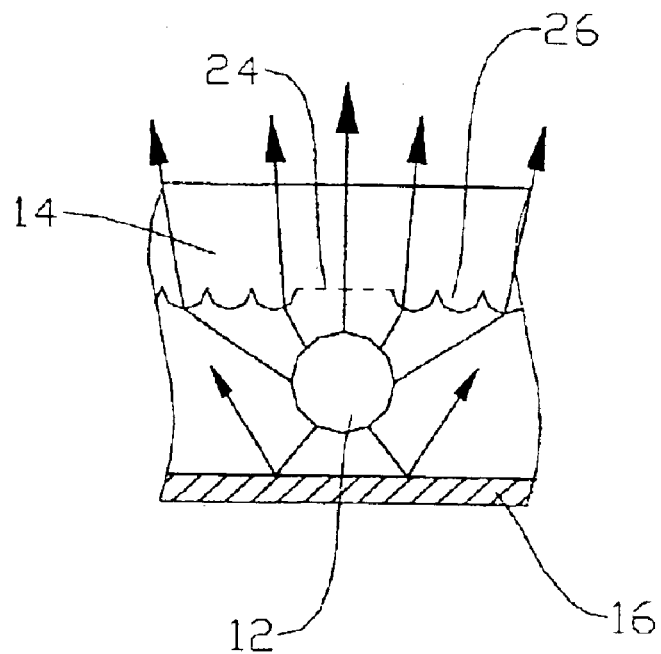
FIG. 5 illustrates an enlarged cross-sectional view of back light module for large LCD device according to the first embodiment of the present invention.

The first embodiment according to this invention is referred to FIG. 4 and FIG. 5. Please refer to FIG. 4, a cross-sectional view of back light module 10 for large LCD device according to the present invention is shown. It comprises a light source 12; a light guide plate (LGP) 14; a reflector 16; a diffusor sheet 18; and a diffusor sheet 20. The light source 12 can be constituted by a row of cold cathode fluorescent lamp (CCFL) or an array of light emitting diode (LED). The material of light guide plate 14 is usually PMMA or plastic division with $TiO_2$ diffusion grains 22 whose total volume is between about 50%~80% of light guide plate. The light rays are well distributed when they are collided with the $TiO_2$ diffusion grains. The reflector 16 is placed below the light guide plate 14 to reflect the downward light rays back into the light guide plate 14 for increasing the illumination of back light module 10. Besides, there are sequentially diffusor sheets 18 and prism sheets 20 on the light guide plate 14 in order to the light rays emitted from the light-emitting surface of light guide plate 14 can be further well distributed into the panel of liquid crystal device (not shown). The numbers of diffusor sheets and prism sheets are decided on the design of the back light module 10.

The bottom surface of light guide plate changed from the fully inclined plane to the plane including several bumps is the main difference between the first embodiment according to the present invention and the conventional structure of back light module for solving the problem of the light rays that enter into the light guide plate not well distributed. As shown in FIG. 5, the section 24 of the bottom surface of light guide plate 14 above the light source 12 still remains plane surface, in other words, the illumination of the section 24 is not changed. The other section 26 of the bottom surface of light guide plate 14 includes several bumps for gathering the light rays to increase the illumination of the section 26 now. So the light rays emitted from the light source 12 enter into the bottom surface of light guide plate 14 are well distributed. It can prevent from the appearance of the light and dark fringes. Besides, the section 24 can be dealt with the matte or shiny process to decrease or reflect the illumination thereof for the light rays emitted from the light source 12 enter into the bottom surface of light guide plate 14 are further well distributed. The section 24 is coated with a metal by the vapor deposition method or the sputtering method in the shiny process. We can use aluminum as the metal material when the lower reflective condition is asked and silver as the metal material when the higher reflective condition is asked.

Figure 6:
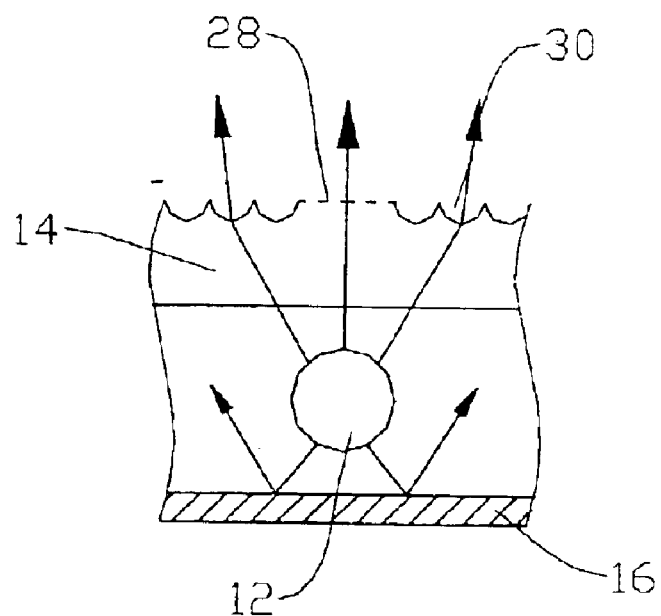
FIG. 6 illustrates an enlarged cross-section view of back light module for large LCD device according to the second embodiment of the present invention.

Please refer FIG. 6, an enlarged cross-section view of back light module for large LCD device according to the second embodiment of the present invention. The section 28 of the top surface of light guide plate 14 above the light source 12 still remains plane surface, in other words, the illumination of the section 28 is not changed. The other section 30 of the top surface of light guide plate 14 includes several recesses for gathering the light rays to increase the illumination of the section 30 now. So the light rays emitted from the light source 12 enter into the top surface of light guide plate 14 are well distributed. Similarly, the section 28 can be dealt with the matte or shiny process to decrease or reflect the illumination thereof for the light rays emitted from the light source 12 enter into the top surface of light guide plate 14 are further well distributed. The section 28 is coated with a metal by the vapor deposition method or the sputtering method in the shiny process. We can use aluminum as the metal material when the lower reflective condition is asked and silver as the metal material when the higher reflective condition is asked.

Although the specific embodiment has been illustrated and described, it will be obvious to those skilled in the art that various modifications may be made without departing from what is intended to be limited solely by the appended claims.

What is claimed is:

1. An improved back light module, comprising:
   a light source;
   a reflector below said light source to reflect back the downward light rays for increasing the illumination of said back light module; and
   a light guide plate above said light source that a first portion of the bottom surface of said light guide plate, which is over said light source, is a plane and a second portion of the bottom surface of said light guide plate, which is not over said light source, has a plurality of regular bumps for focusing the light rays to increase the illumination, wherein said first portion and said second portion are arranged alternately in order.

2. The improved back light module according to claim 1, wherein said light source includes CCFL (Cold Cathode Fluorescent Lamp).

3. The improved back light module according to claim 1, wherein said light source includes LED (light emitting diode).

4. The improved back light module according to claim 1, wherein the material of said light guide plate is PMMA.

5. The improved back light module according to claim 1, wherein the material of said light guide plate is plastic division.

6. The improved back light module according to claim 1, wherein said light guide plate has a plurality of $TiO_2$ diffusion grains whose total volume is between about 50%~80% of said light guide plate.

7. The improved back light module according to claim 1 further comprising a diffusor sheet on said light guide plate.

8. The improved back light module according to claim 1 further comprising a prism sheet on said light guide plate.

9. The improved back light module according to claim 1, wherein said first portion further comprises a matted surface thereon.

10. The improved back light module according to claim 1, wherein said first portion further comprises a shined surface thereon.

11. The improved back light module according to claim 10, wherein said shined surface is a metal formed in sputtering way.

12. The improved back light module according to claim 11, wherein said metal is selected from the group consisting of silver and aluminum.

13. The improved back light module according to claim 10, wherein said shined surface is a metal formed in vapor deposition way.

14. The improved back light module according to claim 13, wherein said metal is selected from the group consisting of silver and aluminum.

15. An improved back light module, comprising:
   a light source;
   a reflector below said light source to reflect back the downward light rays for increasing the illumination of said back light module; and
   a light guide plate above said light source, wherein a first portion of the top surface of said light guide plate, which is over said light source, is a plane and a second portion of the top surface of said light guide plate, which is not over said light source, has a plurality of regular recesses for focusing the light rays to increase the illumination, while said first portion and said second portion are arranged alternately in order.

16. The improved back light module according to claim 15, wherein said light source includes CCFL (Cold Cathode Fluorescent Lamp).

17. The improved back light module according to claim 15, wherein said light source includes LED (light emitting diode).

18. The improved back light module according to claim 15, wherein the material of said light guide plate is PMMA.

19. The improved back light module according to claim 15, wherein the material of said light guide plate is plastic division.

20. The improved back light module according to claim 15, wherein said light guide plate has a plurality of $TiO_2$ diffusion grains whose total volume is between about 50%~80% of said light guide plate.

21. The improved back light module according to claim 15 further comprising a diffusor sheet on said light guide plate.

22. The improved back light module according to claim 15 further comprising a prism sheet on said light guide plate.

23. The improved back light module according to claim 15, wherein said first portion further comprises a matted surface thereon.

24. The improved back light module according to claim 15, wherein said first portion further comprises a shined surface thereon.

25. The improved back light module according to claim 24, wherein said shined surface is a metal formed in sputtering way.

26. The improved back light module according to claim 25, wherein said metal is selected from the group consisting of silver and aluminum.

27. The improved back light module according to claim 24, wherein said shined surface is a metal formed in vapor deposition way.

28. The improved back light module according to claim 27, wherein said metal is selected from the group consisting of silver and aluminum.

* * * * *